Figure 1:
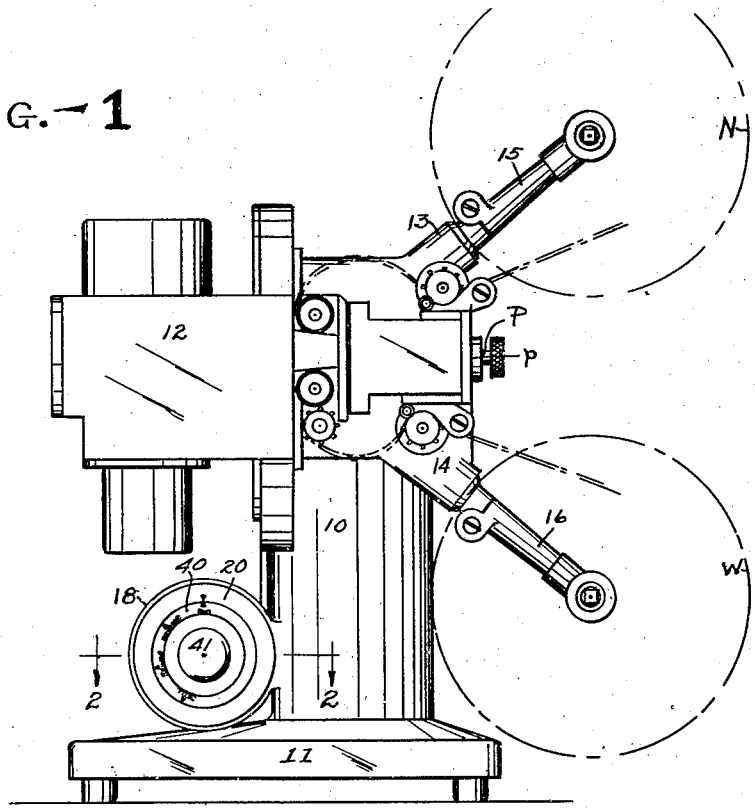

Aug. 8, 1933.   E. S. CARPENTER   1,920,968
ELECTRIC CONTROL FOR MOTION PICTURE PROJECTORS
Filed Jan. 26, 1931   3 Sheets-Sheet 1

Inventor
Ernest S. Carpenter,
By Bates, Golrick & Teare,
Attorneys

Aug. 8, 1933.    E. S. CARPENTER    1,920,968
ELECTRIC CONTROL FOR MOTION PICTURE PROJECTORS
Filed Jan. 26, 1931    3 Sheets-Sheet 2
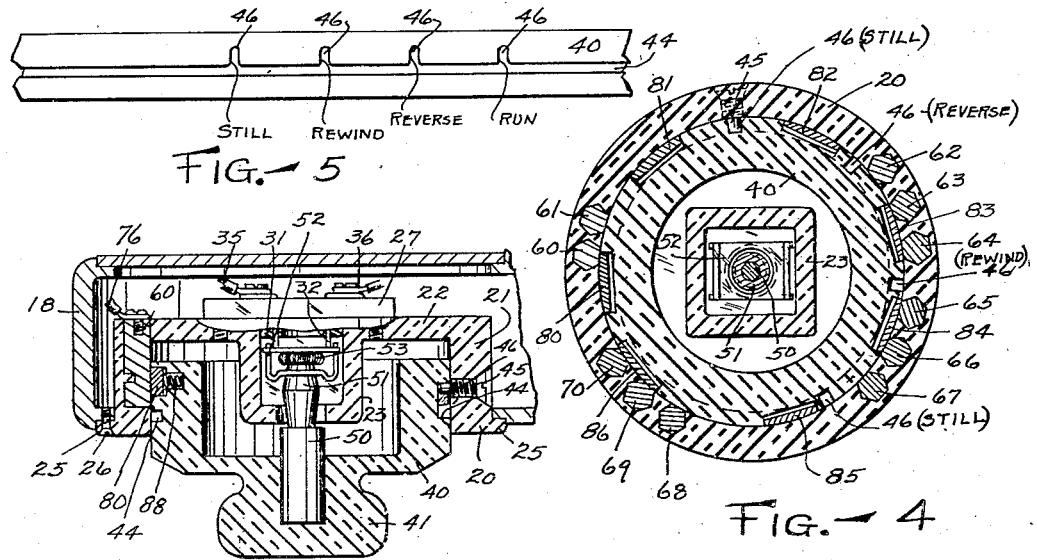

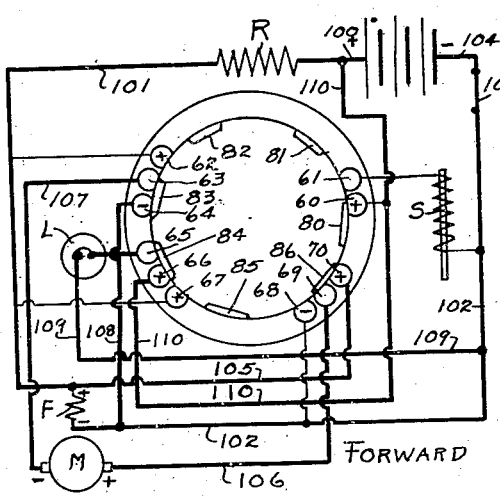
Fig.—7 FORWARD
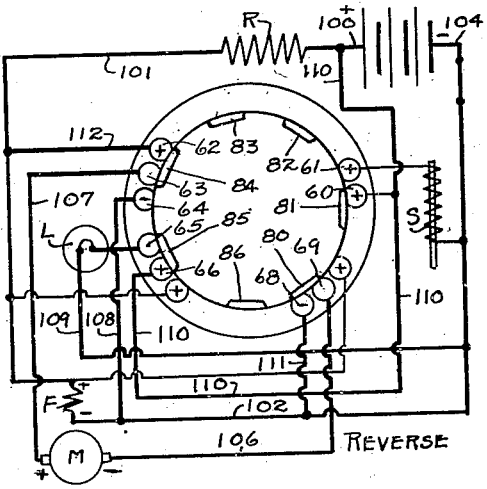
Fig.—8 REVERSE
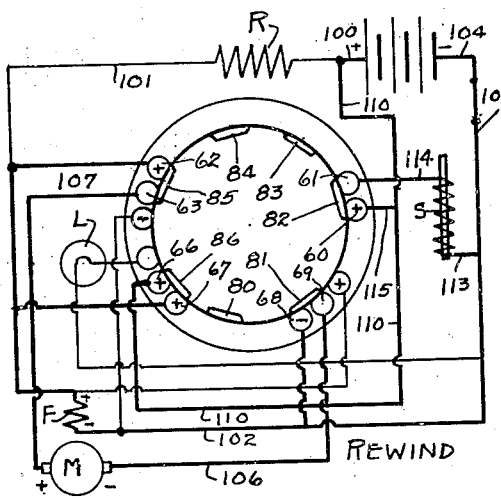
Fig.—9 REWIND
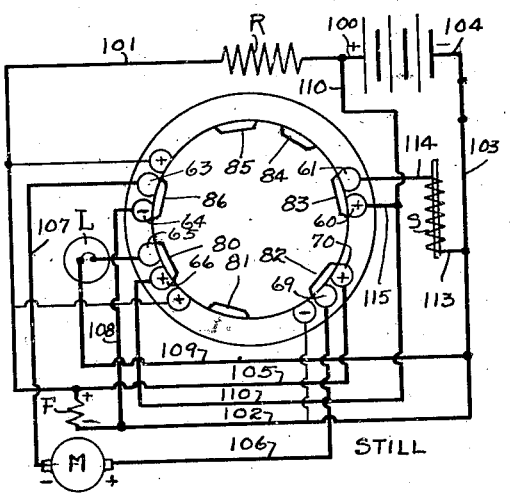
Fig.—10 STILL Patented Aug. 8, 1933

1,920,968

UNITED STATES PATENT OFFICE 1,920,968

ELECTRIC CONTROL FOR MOTION PICTURE PROJECTORS

Ernest S. Carpenter, Cleveland Heights, Ohio, assignor to The Augustus-Carpenter Company, Cleveland, Ohio, a Corporation of Ohio Application January 26, 1931. Serial No. 511,250

14 Claims. (Cl. 200—4)

This invention relates to a motion picture projector having a motor and suitable gearing driven thereby for operating either reel to feed the film forward or backward as well as to operate the intermittent feed, the shutter and a fan for cooling the lamp.

The object of my invention is to provide a unitary control device for the different electric circuits so that, by different positions of such control, I may connect the motor for ordinary exhibiting, or for reversing, and by a simple movement energize the lamp and start the motor. I also contemplate a position for directly rewinding onto the original reel, and a position for projecting a still picture.

In accomplishing the above object, I provide a rotary controller barrel having contacts on its periphery which coact with contacts in a suitable housing for the barrel, all arranged so that by turning the knob to a given position, all the contacts, except the main switch, are set for the operation to be performed. I arrange the main switch so that it is operated by longitudinal movement of the controller knob. Accordingly, by rotating the knob to a desired position and then moving it axially, the projecting machine may be caused to perform any selected one of its four operations of forward drive, reverse drive, rewind and still exhibit.

In carrying out the operation, the rotary controller should be free to rotate in its idle position, but locked against rotation when moved axially into an active position. I effect this by making a groove around the periphery of the rotary barrel, this groove having four longitudinal offsets, and I mount a pin in the housing for the barrel which projects into the groove and is so located that an offset of the groove will register with the pin at the corresponding active position of the barrel.

The main switch, which closes the circuit after the other contacts have been established by the rotation of the barrel, is preferably of the snap type and mounted in a recess in the base of the housing and operated by an axial rod carried by the head of the barrel. This rod is so connected with the bridging contact member carried by it, that when the barrel is moved axially, the contact member is caused to snap into contact with the terminals carried by the housing or out of contact therewith, as the case may be.

My invention includes the combination with a motion picture machine having reels and mechanism for driving them, of a unitary control device for establishing contacts and closing a circuit to cause the various operations. My invention includes also a rotary control device adapted to be set for the various actions of the mechanism, and, when set, operated by a longitudinal movement to close a controlling contact. Still more particularly the invention includes the embodiment of the unitary control in a rotary axially movable barrel within a contact-carrying housing substantially as illustrated in the drawings hereof, and as hereinafter more fully described.

Figure 2:
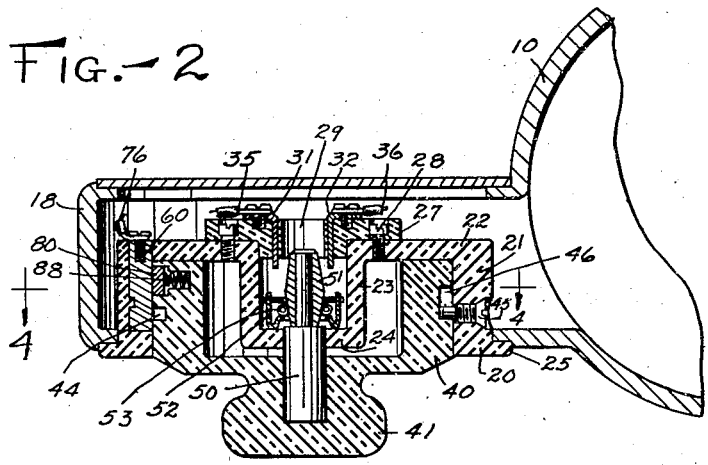

In the drawings Fig. 1 is a side elevation of a motion picture apparatus embodying my electric control; Fig. 2 is a horizontal section through the controller unit, as indicated by the line 2—2 on Fig. 1, being on a larger scale; Fig. 3 is a similar view of the controller unit, with some of the parts in different positions; Fig. 4 is a vertical section through the controller unit on a plane parallel with Fig. 1 as indicated by the line 4—4 on Fig. 2; Fig. 5 is a development of the outer periphery of the controller barrel; Fig. 6 is a diagrammatic vertical section on a plane parallel with Fig. 1 illustrating the various motor driven mechanisms. The remaining figures are diagrams of the circuit connections respectively in the four active positions of the controller, the conductors which are active for the respective settings being shown in heavy lines.

As shown in Figs. 1 and 2, the frame of my projector comprises an upright hollow standard 10 mounted on a suitably extending base 11 and carrying at its rear a support 12 for the lamp and lens and carrying on its forward side, two diagonally projecting hollow brackets 13, 14 on which the reel-holding arms 5, 16 are mounted, preferably by hinge connections.

The motor, the operating mechanism for driving either reel and rotating the shutter and for giving the intermittent feed to the film, and a motor-driven fan for cooling the lamp, are all contained within the hollow standard 10. At the side of the standard 10 and above the base 11 is an offset portion 18 of the hollow frame which carries the unitary control hereinafter described.

The actual form of the mechanism for rotating one reel or the other and for driving the intermittent feed and shutter are not particularly concerned with this invention, but are illustrated diagrammatically in Fig. 6. In that view M indicates an electric motor, R indicates a resistance in series with one of the field terminals of the motor, r a line running directly to such field terminal by-passing the resistance. The motor is indicated as having a shaft m carrying the fan f which serves to cool the lamp indicated at L. The motor, by suitable gearing to be described, drives each reel through ratchets, so that backward rotation of either reel drive is idle. The motor also may actuate the intermittent feed I i and the shutter H. S indicates a solenoid which is adapted to operate a clutch to throw out of action the intermittent feed and shutter and the forward drive.

With the parts as just described, and irrespective of the form of the other mechanisms, an energization of the motor in series with the resistance, and with the solenoid idle, will drive the intermittent feed and shutter and one reel or the other, according to the direction of rotation of the motor, to feed the film in either direction and give the intermediate portion the necessary intermittent feed for exhibition purposes. The coupling of the motor in the reverse direction but with the resistance out and the solenoid active, will effect the rapid rotation of the original reel without operating the intermittent feed or shutter to give an effective rewinding operation. Finally a connection through the resistance to the motor for forward operation and through the solenoid to throw out the clutch, will disconnect the intermittent feed, the shutter, and the forward drive, leaving the motor to operate the fan to cool the lamp, so the parts are proper for a still projection of whatever view happens to register with the lens and lamp.

In order to enable the above operation to be better understood, I will describe the particular driving mechanism shown in Fig. 6. As there indicated, I have mounted on the motor shaft m, a spiral gear A (shown in dotted lines) which meshes with a spiral B, shown in section. This spiral B is rigid with a spiral D, which meshes with the spiral E on the shaft of which is a smaller spiral e meshing with a spiral G on a reel-driving shaft g. This shaft is connected by a ratchet clutch J, with an extension g' bevel geared to a rotary stud K which carries the original reel N of film. Loose within the spirals B and D is a shaft P which carries a spiral Q, which through spiral gearing T and separable shafts with a connecting ratchet clutch U and bevelled gearing operates the stud V of the receiving reel W.

The intermittent drive shown in Fig. 6 is along the lines of the drive shown in Patent No. 1,194,639 granted August 15th, 1916, jointly to myself and Clarence E. Wright, and reference is made to that patent for a fuller description. Briefly, as here shown in Fig. 6, there is a grooved cam wheel I rigid on the shaft P. This wheel has a peripheral groove which for most part lies in a radial plane, but at its ends turns outwardly diagonally in opposite directions. This groove cooperatives with pins on the wheel I so as to turn that wheel one tooth for each rotation of the shaft P. The shutter H is shown as rigidly mounted on the end of the shaft P. Splined to this shaft between the wheel I and the spiral B is the clutch collar C heretofore referred to, which is pressed by a spring c toward active position and may be withdrawn by a shipper mechanism c' connected with the solenoid S. When the solenoid S is inactive, the spring c maintains the clutch C closed with the spiral gear B so that all of the parts on the shaft Q are then locked to it and rotate as a unit. When however, the solenoid is active, the shipper c' withdraws the clutch and thereby renders inactive the shutter, the intermittent feed and the advance reel W.

When the solenoid is idle, if the motor is operated in the direction to turn the driving reel W in the direction of the arrow, Fig. 6, the clutch J operates in the direction to rotate idly and the film is progressed from the reel N to the reel W, intermittently operated by the wheel i and intermittently exposed by the shutter H, this being known as the forward drive of the machine. When the motor operates the drive of the reel N in the winding direction, while the clutch U for the other reel is idle, this gives the reverse. In rewinding, the direction of movement is the same as reverse, but the motor is speeded up by cutting out the resistance, and as the film then passes directly from the reel W to the reel N, the intermittent movement and shutter, (cut out by the solenoid) are idle. For the still operation, the energization of the solenoid disconnects the intermittent feed and the shutter and the forward drive to the reel W, while the direction of the rotation of the motor is such that the clutch J is moved in the idle direction and hence the reel N is not moved. The motor therefore accomplishes only the cooling of the lamp. The intermittent movement may be then manually operated by turning the knob p on the forward end of the shaft P to bring any particular view desired into registration with the lamp.

I will now describe the particular embodiment of my control shown in Figs. 2 to 5 inclusive, which effects the above described circuit connections.

Mounted in the offset portion 18 of the hollow frame is a stationary cup-like housing 20 of insulating material, having a cylindrical wall 21 on a horizontal axis, and a vertical base 22 which has, concentric of the axis, a small inwardly projecting cup portion 23 having a vertical wall 24 at the front. The insulating housing 20 may have a front edge flange 25 overhanging the frame casing 18 to which it may be locked by screws 26.

At the rear of the internal cup portion 23 and bridging across it, is an insulating block 27 secured by screws 28 to the wall 22 and carrying a pair of contacts 31 and 32 which extend forwardly through the block on opposite sides of an opening 29 in the block. These contacts 31 and 32 are L-shaped pieces as shown, and are secured to the insulating block by screws which clamp to the contact conductors 35 and 36 which are parts of the main current line to the lamp and motor. The inner ends of these L-shaped contacts 31 and 32 are exposed within the cup and are adapted to be bridged by a floating metallic member which coacts with them to form the snap switch as previously described.

Rotatively mounted in the annular space within the insulating housing 20 is an insulating barrel 40 integrally carrying an operating knob 41. This barrel has, on its periphery, suitable contacts cooperating with contacts carried by the housing, as hereinafter described. The barrel also carries, rigidly mounted in the knob 41, a rod 50 which has on it a bulging sleeve 51 coming to a central ridge. Surrounding this sleeve is a hollow metallic cage 52 and within this cage is an annular coiled spring 53.

It results from the described construction that if the knob 41 is pulled outwardly, the ridge of the sleeve 51 is moving outwardly, passes through the annular spring 53, and as soon as the ridge has passed that sleeve, the contraction of the spring on the incline of the sleeve causes the cage to snap toward the free end of the rod 50, thus making a contact with the terminals 31 and 32, as shown in Fig. 3. On the other hand, when the outwardly drawn knob is pushed inwardly, the rear conical portion of the sleeve 51 passes through the spring of the cage, expanding the spring, and, as the ridge passes beyond the spring, the contracting spring causes the bridging cage to snap out of contact with the terminals 31 and 32 and come into the position at the head of the cup 23 shown in Fig. 2.

The specific snap switch described is of the Cutler-Hammer type, but its particular mounting and operation by the knob is a part of my invention.

The rotation of the knob 41 establishes the various electric circuits as desired, and then the outward pulling of the knob closes the switch to make these circuits effective, and when the knob has been so pulled, it is locked against rotation, so that the circuit cannot be disturbed until the knob has been pushed inwardly and broken the circuit. To enable this control of the knob, I form in the periphery of the barrel 40, an annular groove 44 which is occupied by the inner end of a pin 45 mounted in the wall 21 of the insulating housing 20. The barrel, when in idle position as shown in Fig. 2, may be rotated freely, the groove 44 traveling across the pin. At each of the active positions of the knob however, I form a longitudinal offset 46 of the groove 44, as indicated in Figs. 2 and 5. When one of these offsets is in registration with the pin, the knob may be pulled outwardly into the position shown in Fig. 3, and when so pulled, the pin occupying the corresponding offset, prevents the rotation of the knob.

For convenience of illustration, I have shown the pin 45 in the plane of the sections of Figs. 2 and 3. However in practice it is inconvenient to locate the pin in this particular location as the contacts in the periphery of the barrel interfere with the offsets 46. The preferred location of the pin is as illustrated at 45 in Fig. 4. It could have any location about the periphery of the barrel if the barrel were long enough so that the offsets 46 could not interfere with the contacts on the periphery of the barrel but to condense the construction, I prefer to make the barrel quite short and arrange the offsets to lie between the peripheral contacts.

The contacts on the barrel above referred to are simply plates mounted in the periphery adapted to bridge two stationary contacts carried by the housing. In Figs. 2 and 3, I illustrate at 60 one of the housing contacts which is connected at its rear to a conductor 76, and these views illustrate at 80 one of the bridging contacts mounted in the barrel, these bridging contacts being short metal plates having arcuate exteriors and mounted in notches in the periphery of the barrel. The plates may be backed up by springs 88 pressing them outwardly.

In the particular embodiment shown, there are seven of these peripheral plates mounted on the barrel and designated in Fig. 4 as 80 to 86 inclusive. In the housing 20 there are in this embodiment eleven contacts similar to 60 designated from 60 to 70 inclusive. I have given the contacts each a different designating number in Fig. 4 for the purpose of identification with the diagrams of Figs. 7 to 10. These contacts have been arranged after much experimenting, to give the various connections desired for the four active positions of the knob and without causing any disturbances of these connections by the non-active contacts.

The active positions of the barrel are preferably on somewhat less than half of its face, as illustrated in Fig. 1. The barrel when idle may stand in any position, but it is shown in Fig. 1 in the position of being ready for forward running; then a simple outward pull of the knob illuminates the lamp and energizes the motor, driving the lower roll and intermittent feed and shutter, thus projecting the picture. When the knob is pushed inwardly, the current is cut off to all parts, then it may be rotated to any of the other three positions and the film projected backwardly if desired, or wound rapidly and directly from the reel W onto the reel N, or left in any standing position subject to the control of the hand knob p.

I will now describe the circuits for the four positions, as indicated by the four diagrams Figs. 7 to 10.

In Fig. 7, which indicates the forward drive, the current comes from a suitable source of supply indicated at 100, thence through the resistance R and the line 101 to the field F of the motor, through that field to the line 102, back through the closed switch 103 (that is the switch 31, 32 and 52 of Fig. 2) to the minus line 104 to the source of supply, indicated conventionally by the battery, though it will usually be an ordinary 110 volt lighting circuit. The switch 103 however, will be open until the knob has been pulled longitudinally.

The line 101 at a point where it joins the field F also continues as 105 to the fixed contact 70. This contact in this position is connected by the bridging contact 86 on the rotary barrel to the contact 69 which is connected by the line 106 with the armature M of the motor. On the other side of this armature the line 107 leads to the contact 63 in the housing. This is connected by the bridge 83 to the contact 64, from which a line 108 leads to the line 102 on the negative side of the field. The armature is thus in a shunt across the field. The line 109 branches from the line 102 and passes through the lamp L to the contact 65 which is engaged by the bridge 84 and connected with the contact 66, from which a line 110 leads back to the plus side of the source of supply. The lamp and motor are thus in parallel with each other on two branches of a divided circuit. When the parts are in this position, the solenoid S is idle, the lamp and motor are energized, and the direction of drive is forward.

In Fig. 8, the connections are the same as Fig. 7, except that the motor armature has been reversed with reference to the field; that is to say, the line 106 from the armature M to the contact 69 is now connected by the bridge 80 with the contact 68, from which a line 111 (which was idle in Fig. 7) leads to the line 102 connected to the negative side of the field F. The line 107 from the other side of the armature which terminates at the contact 63 is now connected by the bridge 84 with the formerly idle contact 62, from which a line 112 leads to the main line 101 on the plus side of the source of supply.

The connections for rewinding (Fig. 9) leave the motor, field and armature coupled as in reverse, but the resistance and the lamp are out of circuit. On the other hand, the solenoid S is in circuit, the line 113, 114 from the main line 103 through the solenoid and terminating at the contact 61 being connected by the bridge 82 to the formerly idle contact 60, from which a line 115 leads to the line 110 going back to the plus side of the source of power. The solenoid is thus bridged across the main lines and is active to disconnect the drive to the lower reel $w$ and disconnect the intermittent feed and shutter.

In Fig. 10 (for still exhibition) the connections are similar to Fig. 9, except that the lamp and resistance are now again energized and while the motor is reversed; the solenoid being energized, the drive to the lower reel W is cut out and the motor drive to the reel N is non-effective (turning in the backward direction) so that in this case the motor is used simply to operate the fan for cooling the lamp. The line 105 from the plus side of the field becomes active in this last connection and leads to the contact 70 which is connected by the bridge 82 with the contact 69 which leads via the line 106 to the armature, and from the other side of the armature the line 107 leads to the contact 63 and is connected by the bridge 86 with the contact 64 from which the line 108 leads to the minus side of the field, the motor being thus connected as in Fig. 1.

It will be seen from the tracing of the diagrams, that a bridging contact on the periphery of the rotary barrel is adapted to serve in several locations for bridging different contacts of the stationary housing, and at the same time these contacts are so arranged that there is no interference of one with the other. For instance, the contact 86, which in Fig. 7 bridges the contact 69 and 70, is idle in Fig. 8, in Fig. 9 bridges the contacts 66 and 67, and in Fig. 10 contacts 63 and 64.

It will be noticed that in my control device the rotary barrel carries no permanent connections, but simply bridging members adapted to cause contact between pairs of terminals carried by the stationary housing. This is true of the terminals about the periphery of the rotary barrel and also true of the main switch. There is therefore no contact likely to become loose or worn. The terminals of the various conductors are effectively secured to the fixed stationary terminals, and the moving bridges are all spring pressed toward the terminals and are maintained clean by the rubbing contact. Accordingly, a very effective contact is made for each position. Moreover all circuit changes are made while the current is off at the main switch, so that no arcing is possible, and the final closure is made by a snap switch of approved type.

It will also be noticed that all of the electric conductors to the contacts are within the hollow offset of the frame at the rear of the stationary housing 20. This housing may be withdrawn to the front of the frame and the flexible wires from the various points within the machine effectively connected to the proper terminals; then the housing may be tightly locked in place.

By making both the housing and the rotary barrel of insulating material, as for instance bakelite, the various contacts are automatically insulated from each other, and are still effectively retained in position. The entire construction is simple, and still very effective to produce the simple unitary control desired.

I claim:

1. A unitary control, comprising a housing carrying fixed contacts arranged in a circular course about an axis, conductors leading from said contacts to various parts of the apparatus, a barrel rotatable on the housing axis and having bridging contacts on its periphery adapted to bridge various pairs of contacts of the housing, whereby the rotation of the barrel may select the operation to be performed, and means for closing a controlling switch common to all of the alternative circuits selected by the rotation of the barrel.

2. A unitary control device comprising a rotary barrel, a surrounding sheath, terminals spaced about the inner periphery of the sheath, bridge plates carried on the exterior of the barrel and adapted to coact with various pairs of sheath terminals, means for interlocking the sheath and barrel comprising a groove in one of them and a pin on the other, said groove extending in a circumferential direction but provided with various longitudinal offsets for the different positions of the barrel to enable the barrel to move longitudinally in the sheath in any of its set positions, and a snap switch carried in part by the barrel and operated by said longitudinal movement.

3. A unitary control device comprising an insulating cup having fixed contacts exposed on its inner periphery, conductors leading from said contacts, an insulating barrel rotatably mounted in the cup and having bridging contacts on its outer periphery, means to hold the barrel within the cup so as to allow free rotation without longitudinal movement to select the contacts, and means to allow longitudinal movement of the barrel when the contacts have been selected, a pair of main terminals applicable to all the circuits, a movable bridge therefor, and means operable by longitudinal movement of the barrel for snapping the bridge into engagement with the contacts.

4. A unitary control device comprising an insulating housing, an insulating barrel extending into the housing, said barrel having an axial knob on its front end by which it may be rotated, a peripheral groove in the barrel having longitudinal offsets, a pin carried by the cup and extending into said groove whereby the barrel for the most part may rotate freely and cannot move longitudinally, while in certain positions it may move longitudinally and then cannot rotate, a main switch operated by a longitudinal movement of the barrel, and peripheral contacts on the exterior of the barrel and interior of the housing brought into coaction by the rotation of the barrel and maintained in such coaction independently of the longitudinal movement of the barrel.

5. In a unitary control device, the combination of an outwardly facing cup and a smaller inwardly facing cup carried by the base of the outwardly facing cup, a hollow barrel rotatively mounted within the larger cup, the hollow of the barrel freely embracing the smaller cup, fixed terminals exposed in the inner periphery of the larger cup, bridging contacts on the exterior of the barrel adapted to cooperate with the peripheral contacts of the cup, a pair of main contacts carried by the base of the larger cup across the opening to the smaller cup, an axial rod carried by the barrel and extending into the smaller cup, and a movable bridging contact within the smaller cup actuated into and out of contact with the main terminal, by the axial movement of the barrel.

6. A unitary control device comprising an insulating housing in the form of a cup with a reversely placed smaller cup within it, an insulating hollow barrel extending into the annular space within the larger cup and around the smaller cup, said barrel having an axial knob on its front face by which it may be rotated, a peripheral groove in the barrel having longitudinal offsets, a pin carried by the cup and extending into said groove whereby the barrel for the most part may rotate freely and cannot move longitudinally, while in certain positions it may move longitudinally and then cannot rotate, peripheral contacts on the interior of the larger cup and on the exterior of the barrel, and a main switch within the smaller cup operated by a rod carried by the barrel and extending slidably through the head of the smaller cup.

7. A unitary control device comprising a cylindrical member with exposed contacts, conductors connecting said contacts to various circuits, a rotatable member having a surface complementary to the cylindrical member, bridging contacts on the rotatable member adapted to connect various pairs of the exposed contacts, said rotatable member having a limited longitudinal movement in its selective positions only, and a main switch for closing a circuit common to all the selective circuits, said main switch being actuated by the longitudinal movement of the rotatable member.

8. A unitary control device comprising a rotary member, a cylindrical surface adjacent the rotary member, terminals spaced about the cylindrical surface, bridge plates carried on the rotary member and adapted to coact with various pairs of terminals, means for interlocking the rotary member and cylindrical surface comprising a groove in one of them and a pin on the other, said groove extending in a circumferential direction but provided with various longitudinal offsets for different positions of the rotary member, to enable the rotary member to move longitudinally of the cylindrical surface in any of its set positions, and a main switch operated by said longitudinal movement.

9. A unitary control device comprising a set of fixed contacts, conductors leading to said contacts, a rotatable barrel having on its periphery bridging contacts adapted to connect various pairs of said fixed contacts, said barrel having a limited longitudinal movement in any of its selected positions while its peripheral contacts slide on the fixed contacts which they engage, and a main switch actuated by the axial movement of the barrel itself for closing the circuit to said conductors.

10. A unitary control switch for connecting a source of power to various parts of an apparatus comprising having in combination a rotatable member, an adjacent fixed member, fixed contacts carried by one of the members, bridging contacts carried by the other member, the bridging contacts being connectible with the fixed contacts by rotation of one of the members relative to the other, a power-connecting snap-switch operable by longitudinal movement of one of the members relative to the other, while the two sets of contacts slide on each other, and a circuit controlled by said snap-switch and connected with one of said sets of contacts to energize the same.

11. A unitary control device comprising a set of fixed contacts, conductors leading to said contacts, a rotatable barrel having on its periphery bridging contacts adapted to connect various pairs of said fixed contacts, said barrel having a limited longitudinal movement in any of its selected positions while its peripheral contacts slide on the fixed contacts which they engage, and a main snap-switch for closing the circuit to said conductors, said snap-switch having fixed terminals and a movable bridge therefor actuated by such longitudinal movement of the barrel.

12. A unitary control device comprising a housing having a cylindrical interior with exposed contacts, conductors leading to said contacts, a barrel having a cylindrical exterior and rotatably mounted in the housing and having on its periphery bridging contacts adapted to connect various pairs of said exposed contacts carried by the housing, said barrel having a limited longitudinal movement within the housing in any of its selected positions while its peripheral contacts slide on the fixed contacts which they engage, and a main switch actuated by such longitudinal movement of the barrel but movable relative to the barrel.

13. A unitary control device comprising an insulated cup, fixed terminals carried thereby and exposed on the inner periphery of the cup, an insulating barrel rotatively mounted within the cup and carrying various bridging contacts on its periphery, a pair of main terminals carried by the base of the cup and constituting part of the power circuit to said fixed terminals, a movable bridge therefor, and means operated by the longitudinal movement of the barrel for automatically moving said bridge relatively to the barrel into and out of contact with the main terminals.

14. A unitary control device comprising a set of fixed contacts, conductors leading to said contacts, a rotatable barrel having on its periphery bridging contacts adapted to connect various pairs of said fixed contacts, said barrel having a limited longitudinal movement in any of its selected positions while its peripheral contacts slide on the fixed contacts which they engage, and a main switch for closing the circuit to said conductors, said main switch having fixed terminals and a movable bridge therefor located within a central cavity in the barrel and automatically actuated by such longitudinal movement of the barrel to snap into or out of engagement with its associated fixed terminals.

ERNEST S. CARPENTER.